(12) United States Patent
Hu

(10) Patent No.: US 6,823,082 B2
(45) Date of Patent: Nov. 23, 2004

(54) METHOD OF COMPRESSING DIGITAL IMAGES

(75) Inventor: Xiaoping Hu, San Jose, CA (US)

(73) Assignee: Boly Media Communications, Inc., Cupertino, CA (US)

(*) Notice: Subject to any disclaimer, the term of this patent is extended or adjusted under 35 U.S.C. 154(b) by 631 days.

(21) Appl. No.: 09/860,109

(22) Filed: May 16, 2001

(65) Prior Publication Data

US 2002/0172418 A1 Nov. 21, 2002

Related U.S. Application Data

(63) Continuation-in-part of application No. 09/792,668, filed on Feb. 21, 2001, now Pat. No. 6,757,429.

(51) Int. Cl.$^7$ ................................................. G06K 9/00
(52) U.S. Cl. ........................................ 382/166; 382/240
(58) Field of Search ................................ 382/162–167, 382/232–250

(56) References Cited

U.S. PATENT DOCUMENTS

| | | | | |
|---|---|---|---|---|
| 5,408,542 A | * | 4/1995 | Callahan | 382/244 |
| 5,432,870 A | * | 7/1995 | Schwartz | 382/232 |
| 5,973,803 A | * | 10/1999 | Cheung et al. | 358/534 |
| 6,031,940 A | * | 2/2000 | Chui et al. | 382/240 |
| 6,307,971 B1 | * | 10/2001 | Persiantsev et al. | 382/236 |
| 6,545,710 B1 | * | 4/2003 | Kubo et al. | 348/223.1 |
| 6,594,387 B1 | * | 7/2003 | Pettitt et al. | 382/167 |
| 6,757,429 B2 | * | 6/2004 | Hu | 382/166 |

OTHER PUBLICATIONS http://www.faqs.org/faqs/jpeg–faq/part1/section–2.html, [2] Why use JPEG?, 2 pages, Jan. 8, 2001.
http:/www.faqs.orq/faqs/compression–faq/part2/section–1.html, [70] Introduction to data compression (long), 6 pages, Jan. 9, 2001.
*Information Technology: JPEG 2000 Image Coding System*, JPEG 2000 Committee Draft Version 1.0, pp. i–164, Dec. 9, 1999.
http://www.faqs.org/faqs/compression–faq/part2/section–6.html, [75] Introduction to JPEG, 5 pages, Jan. 9, 2001.
http://www.faqs.org/faqs/compression–faq/part2/section–3.html, [72] What is wavelet theory?, 3 pages, Jan. 9, 2001.
http://www.faqs.org/faqs/jpeg–faq/part1/section–1.html, [1] What is JPEG?, 2 pages, Jan. 8, 2001.

*Primary Examiner*—Jingge Wu
(74) *Attorney, Agent, or Firm*—Edward C. Kwok; MacPherson Kwok Chen & Heid LLP

(57) ABSTRACT

A method of compressing digital representations of images stores the images in multiple subsampling quality scales in a progressive manner such that a higher quality scale contains only data incremental to the data in an adjacent lower quality scale. The data in each quality scale is transformed, quantized, and entropy encoded. A discrete wavelet cosine transformation combining frequency transformation features of a discrete cosine transformation and spatial transformation features of a wavelet transformation is provided. Sequences of subsampling quality scales are provided for multi-scale representations of images. A novel context selection method is used which treats color components and coefficients of different positions differently. An image compressed in a given quality scale can be transmitted or decompressed progressively allowing progressive downloading or transmission over the Internet.

31 Claims, 3 Drawing Sheets

| $P_{0,0}$ | $C_3$ | $C_2$ | $C_1$ | $P_{0,i}$ | | | |
|---|---|---|---|---|---|---|---|
| $C_3$ | | | | | | | |
| $C_2$ | | | | | | | |
| $C_1$ | | | | | | | |
| $P_{i,0}$ | | | | $C_3$ | $C_2$ | | |
| | | | | $C_1$ | $P_{j,i}$ | | |
| | | | | | | | |

FIG. 3

METHOD OF COMPRESSING DIGITAL IMAGES

RELATED APPLICATION

This application is a continuation-in-part of U.S. application Ser. No. 09/792,668, now U.S. Pat. No. 6,757,429 filed Feb. 21, 2001.

FIELD OF THE INVENTION

This invention relates generally to compression of digital images and in particular to methods of digital image compression that store or transmit compressed image data in multiple quality scales in a progressive manner.

BACKGROUND

Digital storage and display of high quality color images has become ubiquitous. In order to overcome massive storage requirements and reduce transmission time and cost of high quality digital images, data compression methods have been developed. In particular, the method known as JPEG and the recent update known as JPEG2000 have become industry standards. Data compression generally involves a tradeoff between data size and reconstructed image quality. When reconstructed images differ from the original image, the data compression method is said to be "lossy."

As is well known, in the basic JPEG method, an image is transformed into a luminance/chrominance color representation conventionally denoted as YUV or YCbCr, where Y is a primary color or luminance component and U and V or Cb and Cr are secondary color components. The number of secondary components stored is reduced by averaging together groups of pixels. The pixel values for each component are grouped into blocks and each block is transformed by a discrete cosine transform (DCT). In each block, the resulting DCT coefficients are quantized, that is divided by a predetermined quantization coefficient and rounded to integers. The quantized coefficients are encoded based on conditional probability by Huffman or arithmetic coding algorithms known in the art. A normal interchange JPEG file includes the compression parameters, including the quantization tables and encoding tables, in the file headers so a decompressor program can reverse the process.

Optional extensions to the minimum JPEG method include a progressive mode intended to support real time transmission of images. In the progressive mode, the DCT coefficients may be sent piecemeal in multiple scans of the image. With each scan, a decoder can produce a higher quality rendition of the image. However, in most implementations, the same number of pixels is used at each level of quality.

Despite the widespread implementation of the JPEG and JPEG2000 methods, each method has its own drawbacks. The major problems in JPEG compression include a moderate compression ratio, a block effect, and poor progressive image quality. A major step used in JPEG to achieve reasonable data compression is to quantize the DCT coefficients. However, light quantization leads to a low compression ratio while heavy quantization leads to block effects in which block boundaries can be seen in reconstructed images. Using the JPEG method, image quality does not degrade gracefully with compression ratio. Therefore, a progressively decoded JPEG image is not pleasing to the viewer until the last scan of the image is decoded.

JPEG2000 is designed to overcome some of the drawbacks of JPEG. JPEG2000 uses a wavelet transform that degrades more gracefully as the compression ratio increases. However, JPEG2000 comes with a price of increased computational complexity. The progression methods employed in JPEG2000 require excessive computational power for both encoding and decoding. While the wavelet transform in JPEG2000 improves quality degradation with respect to compression ratio, it does not improve data compaction intrinsically, such that the compression ratio is about the same as that of JPEG when high quality is required. Further, the context prediction method used for arithmetic coding in JPEG2000 does not take advantage of the fact the colors of objects in a picture are highly correlated.

Therefore, there remain opportunities to improve existing technologies for image compression. It would be desirable to provide a better transform that has fast implementations and makes data more compact. A more efficient and better quality progression method is also desired. Finally, there is an opportunity to utilize color correlation in context prediction and to provide a compression method for color spaces other than the YUV space.

SUMMARY

A method of compressing digital representations of images provides the ability to store the images in multiple subsampling quality scales in a progressive manner such that a higher quality scale contains only data incremental to the data in an adjacent lower quality scale. The method can be implemented in software, in dedicated hardware, or in a combination of software and hardware.

The method is primarily applied to three-color images represented in terms of a primary color component and secondary color components, associated with pixels forming a two-dimensional array. Multiple color spaces, for example, the RGB space or the YUV luminance/chrominance color space can be treated. According to the method, first an image is represented in a sequence of quality scales of progressively decreasing quality. In the sequence, a lower quality scale is formed from a higher quality scale by decreasing the number of stored color components or by decreasing the number of pixels of some or all of the color components.

In one useful scale sequence, for the first, that is the highest, quality scale, all color components are present for each pixel. At the second quality scale, the primary color component and one secondary color component are present for each pixel. At the third quality scale, a primary color component is present at each pixel and twice as many primary color components as secondary color components are present. The sequence also includes fourth, fifth, and sixth quality scales derived from the first, second, and third quality scales, respectively, by reducing the number of pixels by a downscaling process. Downscaling processes such as decimation scaling, bilinear scaling, or bicubic scaling may be used.

A second useful scale sequence of quality scales includes the first, second, and third scales described above together with a fourth quality scale in which one color component is present at each pixel location and twice as many primary components as secondary components are present. The latter scale is known as the Bayer pattern.

Each representation at a higher quality scale is represented in terms of a differential with respect to the image at the adjacent lower quality scale. Each differential image contains only data incremental to the corresponding lower quality scale. The differential images are determined from reconstructed images at the adjacent lower quality scale which avoids accumulation of error. The original representation is thus transformed into the representation at the lowest quality scale plus the differential images.

As part of the process of representing the image as differentials, the base quality scale image and the differential images are transformed into a set of coefficients associated with known functions. In typical implementations, the lowest quality scale representation and the differential images are each divided into blocks before the transform stage. In conventional JPEG methods, a discrete cosine transformation is used. According to an aspect of the present invention, a transformation termed the discrete wavelet cosine transformation (DWCT) which combines the frequency transformation features of a discrete cosine transformation and the spatial transformation, multi-resolution features of the Haar wavelet transformation may be used. The DWCT is defined recursively from a discrete cosine transform and a permutation function whereby output elements of the transform are separated into a first portion and a second portion, the first portion containing lower scales of representation of input to the transform. The DWCT transformation is both faster than conventional wavelet transformations and provides a better compaction of coefficient values than previously used transformations. The DWCT coefficients are quantized by dividing by values specified in quantization tables and rounding to integers.

Quantized coefficients corresponding to the base quality scale and the differential images are compressed by a lossless ordered statistics encoding process. The ordered statistics encoding process includes the stages of context prediction, ordering the two-dimensional array into a one-dimensional array, and arithmetic encoding. According to another aspect of the invention, the process of context prediction, that is predicting the value of each coefficient from the values of coefficients at neighboring pixels, predicts each color component separately. For the primary color component, the context for a given pixel comprises a positional index and neighboring coefficients of primary color pixels. For a first secondary color, the context comprises a positional index, coefficients of neighboring first secondary color components, and the coefficient of the corresponding primary color component of the same positional index. For a second secondary color component, the context comprises a positional index, neighboring second secondary color coefficients, and the coefficients of the corresponding primary and first secondary color components of the same positional index. In the present context prediction method, the coefficients are divided into four groups based on position in the array and the position of neighboring coefficients used for context prediction differs for each group.

According to yet another aspect of the present invention, an ordering process defined here as the quad-tree ordering method is used to maximize data correlation. In the quad-tree ordering method, the two-dimensional array of coefficients is partitioned into four equally sized regions ordered as upper left, upper right, lower left, and lower right. Each region is repeatedly partitioned into four equally sized subregions ordered as upper left, upper right, lower left, and lower right until a subregion of one pixel by one pixel in size is obtained. Ordering can be done before quantization or context prediction as long as the mapping is preserved for all relevant data such as coefficients, quantization tables, and contexts. The context-predicted, ordered coefficient values are then encoded using a lossless encoding method, for example an arithmetic encoding method.

The present compression process produces a bitstream that can be efficiently stored or transmitted over a computer network. A decompression process essentially reverses the process and thus enables the image to be reconstructed. An image compressed according to the present process can be progressively viewed or downloaded by transmission over a computer network or the Internet. Further, a browser can display an image at a specified quality scale, ignoring any data corresponding to quality scales higher than the specified scale.

BRIEF DESCRIPTION OF THE DRAWINGS

FIG. 3 illustrates groups 0 to 3 used for context prediction according to an embodiment of the present invention.

DETAILED DESCRIPTION

Methods of compressing digital representations of images according to embodiments of the present invention represent the images in multiple subsampling quality scales in a progressive manner that avoids accumulation of error. In this application, the methods are discussed with reference to still images. However, since each image in any kind of video sequence can be treated as a still image, the present methods are also applicable to video images. The images treated by the present methods are primarily three-color images represented in terms of a primary color component (denoted by P) and secondary color components (denoted by S and Q,) associated with pixels forming a two-dimensional array. However, the methods can be extended to single-color or multi-color images, as well. The P, S, and Q components correspond, for example, to the G, R, and B components, respectively, in the RGB color space and to the Y, U, and V components, respectively in the YUV luminance/chrominance color space. Typically, then, the input to the data compression methods is a two-dimensional array of pixels each having three color components, and the output is a one-dimensional bitstream of compressed data.

The methods can be implemented in software running on a general purpose computer processing unit (CPU) or a digital signal processor (DSP), in hardware, for example a VLSI chip, or in a combination of hardware and software. When the methods are implemented in software, the computer instructions for carrying out the methods may be stored in a memory associated with the CPU or DSP. Thus, the term apparatus, as used here, refers to a dedicated hardware apparatus with pre-programmed instructions, general purpose computer and associated memory with stored instructions, or any combination of dedicated hardware and computers executing instructions. A compressed image may be stored on a memory for later retrieval and display on a monitor or may be transmitted over an internal network or an external network such as the Internet.

Figure 1:
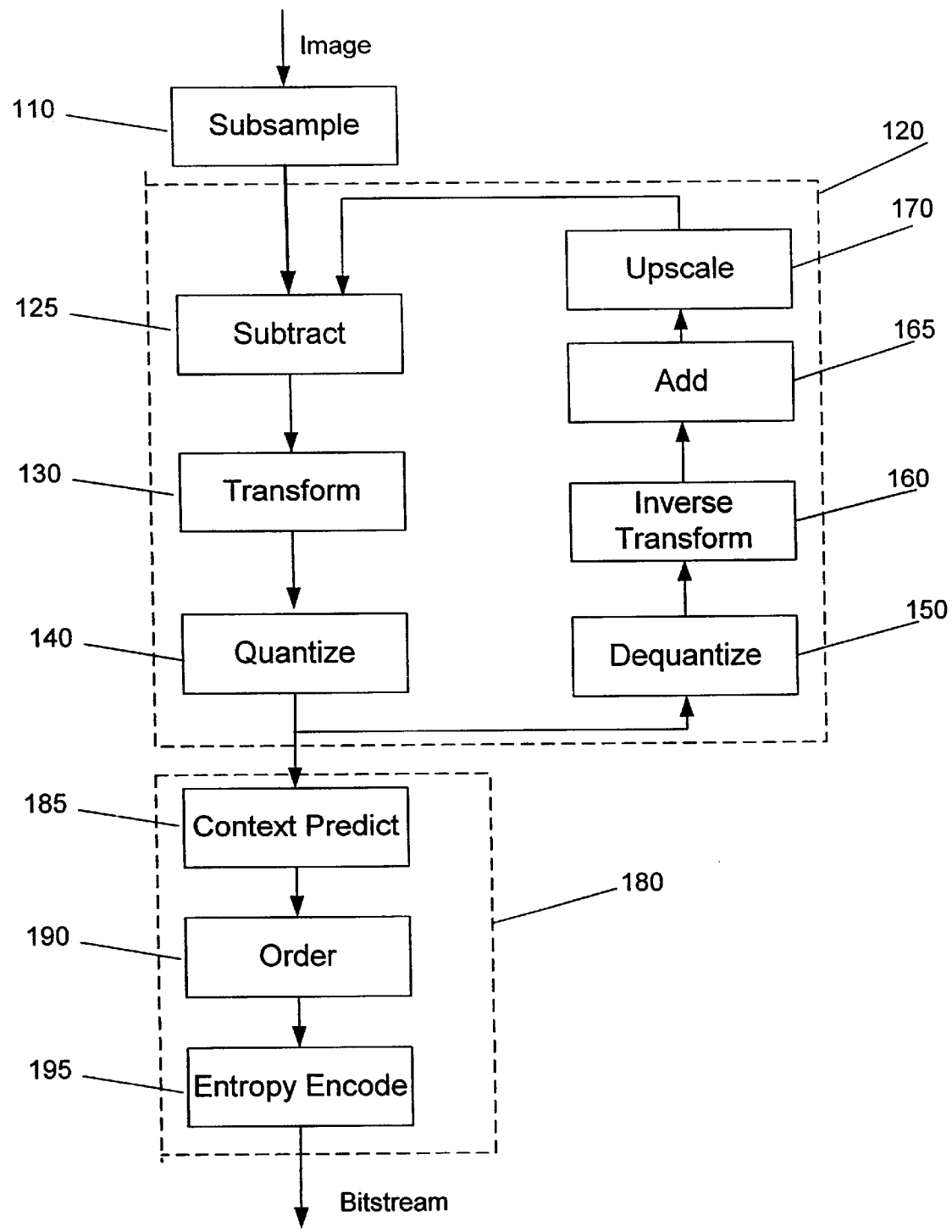
FIG. 1 is a flow diagram of a process of compressing digital still images according to embodiments of the present invention.

An overview of the present methods of compressing digital representations of images is given in the flow diagram of FIG. 1. In the subsampling stage, 110, an original image is decomposed into multiple quality scales from a highest quality scale, which is termed the Compression Quality Scale (CQS) to a lowest, or base, quality scale, termed the Subsampling Quality Scale (SQS). The image data at the base quality scale, SQS, is output first, followed by the next scale, and so forth until the data at the CQS is output.

The differentiation stage, 120, represents the subsampled images in a differential form such that each differential image contains only data additional to the image at a lower quality scale. The differentiation stage, which includes stages 125 to 170, determines the difference between a subsampled image and a reference image scaled up from a reconstructed image subsampled at the adjacent lower quality scale. As described in detail below, the reconstructed image is formed by treating a subsampled image by a lossy transformation, consisting here of a transform stage 130 and a quantize stage 140 and then reconstructing the image by a dequantize stage 150, which is the inverse of stage 140, and an inverse transform stage 60. The output of the differentiation stage 120 is the quantized base quality scale and the quantized differential images.

Figure 2:
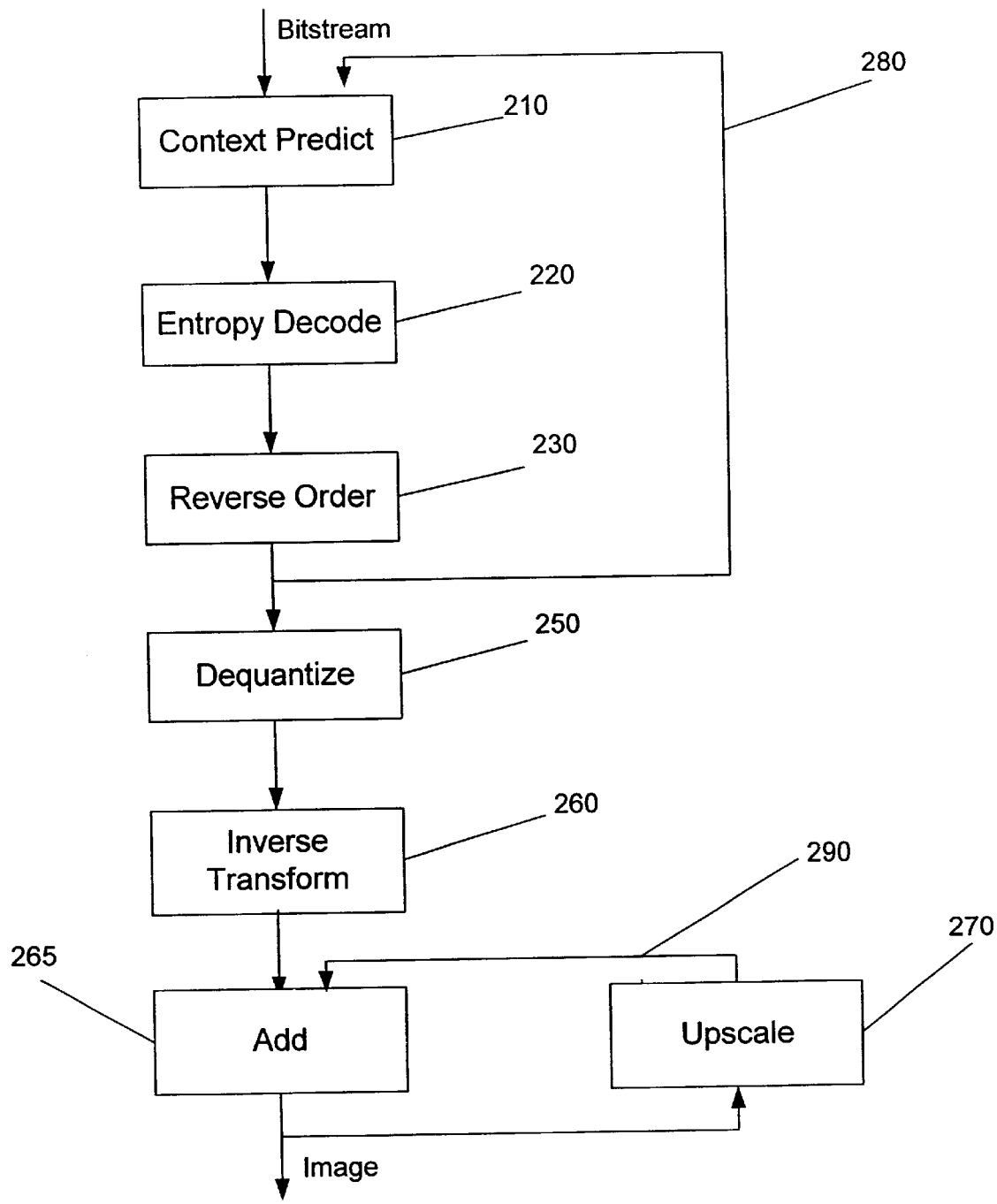
FIG. 2 is a flow diagram of a process of decompressing bitstream data into digital images according to embodiments of the present invention.

The quantized base image and differential images are converted to a bitstream of compressed data by a lossless ordered statistics encoding process. The ordered statistics encoding process includes a context prediction stage 185, an ordering stage 190, in which the two-dimensional array referenced to pixels is converted to a one-dimensional array, and a lossless entropy encoding stage 195, such as arithmetic encoding. A decompression method essentially reverses the compression process as shown in FIG. 2 and discussed in detail below.

In one embodiment, a total of seven subsampling scales are defined for use at subsampling stage 110, although different subsampling sequences can be defined similarly. The seven subsampling scales are enumerated from 0 to 6, with 0 representing the highest quality scale, and 6 the lowest quality scale. Each scale number indicates a particular way of subsampling the image data.

In scale 0, denoted 4:4:4, the original image is not subsampled at all. All P, S, and Q components are kept at all pixel positions, as shown in Table 1.

TABLE 1

| Scale 0: 4:4:4 Subsampling | | | |
|---|---|---|---|
| (P, S, Q) | (P, S, Q) | (P, S, Q) | (P, S, Q) |
| (P, S, Q) | (P, S, Q) | (P, S, Q) | (P, S, Q) |
| (P, S, Q) | (P, S, Q) | (P, S, Q) | (P, S, Q) |
| (P, S, Q) | (P, S, Q) | (P, S, Q) | (P, S, Q) |

In scale 1, denoted 4:2:2, the primary component P is not subsampled at all; only S and Q components are subsampled. There are six modes of subsampling in this scale, as shown in Tables 2–7 below.

TABLE 2

| Scale 1: 4:2:2 Subsampling Mode 1 | | | |
|---|---|---|---|
| (P, S, x) | (P, x, Q) | (P, S, x) | (P, x, Q) |
| (P, S, x) | (P, x, Q) | (P, S, x) | (P, x, Q) |
| (P, S, x) | (P, x, Q) | (P, S, x) | (P, x, Q) |
| (P, S, x) | (P, x, Q) | (P, S, x) | (P, x, Q) |

Mode 1 of the 4:2:2 subsampling method is the same as the subsampling scheme used in the TV industry and as the MPEG2 Standard for transmitting moving images. In the tables, an "x" indicates a missing component. In the second mode, shown in Table 3, the S and Q components are diagonally aligned so that the spacing is uniform along horizontal and vertical directions for S and Q components. Mode 2 is a preferred subsampling mode for scale 1.

TABLE 3

| Scale 1: 4:2:2 Subsampling Mode 2 | | | |
|---|---|---|---|
| (P, S, x) | (P, x, Q) | (P, S, x) | (P, x, Q) |
| (P, x, Q) | (P, S, x) | (P, x, Q) | (P, S, x) |
| (P, S, x) | (P, x, Q) | (P, S, x) | (P, x, Q) |
| (P, x, Q) | (P, S, x) | (P, x, Q) | (P, S, x) |

The third mode is a trivial variation of Mode 2 with the positions of S and Q interchanged, as shown in Table 4.

TABLE 4

| Scale 1: 4:2:2 Subsampling Mode 3 | | | |
|---|---|---|---|
| (P, x, Q) | (P, S, x) | (P, x, Q) | (P, S, x) |
| (P, S, x) | (P, x, Q) | (P, S, x) | (P, x, Q) |
| (P, x, Q) | (P, S, x) | (P, x, Q) | (P, S, x) |
| (P, S, x) | (P, x, Q) | (P, S, x) | (P, x, Q) |

The fourth mode is a transposed mode of Mode 1, with spacing favoring the horizontal direction.

TABLE 5

| Scale 1: 4:2:2 Subsampling Mode 4 | | | |
|---|---|---|---|
| (P, S, x) | (P, S, x) | (P, S, x) | (P, S, x) |
| (P, x, Q) | (P, x, Q) | (P, x, Q) | (P, x, Q) |
| (P, S, x) | (P, S, x) | (P, S, x) | (P, S, x) |
| (P, x, Q) | (P, x, Q) | (P, x, Q) | (P, x, Q) |

The fifth and sixth modes are trivial variations of Mode 1 and 4, with the positions of S and Q interchanged.

TABLE 6

| Scale 1: 4:2:2 Subsampling Mode 5 | | | |
|---|---|---|---|
| (P, x, Q) | (P, S, x) | (P, x, Q) | (P, S, x) |
| (P, x, Q) | (P, S, x) | (P, x, Q) | (P, S, x) |
| (P, x, Q) | (P, S, x) | (P, x, Q) | (P, S, x) |
| (P, x, Q) | (P, S, x) | (P, x, Q) | (P, S, x) |

TABLE 7

| Scale 1: 4:2:2 Subsampling Mode 6 | | | |
|---|---|---|---|
| (P, x, Q) | (P, x, Q) | (P, x, Q) | (P, x, Q) |
| (P, S, x) | (P, S, x) | (P, S, x) | (P, S, x) |
| (P, x, Q) | (P, x, Q) | (P, x, Q) | (P, x, Q) |
| (P, S, x) | (P, S, x) | (P, S, x) | (P, x, Q) |

In scale 2, denoted 4:2:0, the primary component P is also not subsampled at all; only S and Q components are subsampled. There are many modes of subsampling in this scale, by locating S and Q in different positions. The five most useful modes are the following.

TABLE 8

| Scale 2: 4:2:0 Subsampling Mode 1 | | | | | |
|---|---|---|---|---|---|
| P |  | P | P |  | P |
| P | (S, Q) | P | P | (S, Q) | P |
| P |  | P | P |  | P |
| P | (S, Q) | P | P | (S, Q) | P |

The first mode is similar to the YUV 4:2:0 chroma format used in MPEG2 and JPEG standards. In this mode, every four pixels of P share a pair of S and Q components, located at the center of the four P pixels. In the second mode, the S and Q components are not co-sited. Rather, they are aligned diagonally and co-sited with a different P pixel, as shown in Table 9.

TABLE 9

Scale 2: 4:2:0 Subsampling Mode 2

| (P,S) | P     | (P,S) | P     |
|-------|-------|-------|-------|
| P     | (P,Q) | P     | (P,Q) |
| (P,S) | P     | (P,S) | P     |
| P     | (P,Q) | P     | (P,Q) |

The other three modes are just variations of Mode 2, with S and Q distributed over different locations, as shown in Tables 10–12.

TABLE 10

Scale 2: 4:2:0 Subsampling Mode 3

| (P,Q) | P     | (P,Q) | P     |
|-------|-------|-------|-------|
| P     | (P,S) | P     | (P,S) |
| (P,Q) | P     | (P,Q) | P     |
| P     | (P,S) | P     | (P,S) |

TABLE 11

Scale 2: 4:2:0 Subsampling Mode 4

| P     | (P,Q) | P     | (P,Q) |
|-------|-------|-------|-------|
| (P,S) | P     | (P,S) | P     |
| P     | (P,Q) | P     | (P,Q) |
| (P,S) | P     | (P,S) | P     |

TABLE 12

Scale 2: 4:2:0 Subsampling Mode 5

| P     | (P,S) | P     | (P,S) |
|-------|-------|-------|-------|
| (P,Q) | P     | (P,Q) | P     |
| P     | (P,S) | P     | (P,S) |
| (P,Q) | P     | (P,Q) | P     |

Scale 3 is the Bayer Pattern which is often used as a sampling pattern in imaging sensor technology. In scale 3 there are four modes, each defining a particular structure of color components. In the first mode, shown in Table 13, only one color component is preserved as each pixel location. The primary color has twice as many elements as the secondary colors.

TABLE 13

Scale 3: Bayer Pattern Subsampling Mode 1

| P | S | P | S |
|---|---|---|---|
| Q | P | Q | P |
| P | S | P | S |
| Q | P | Q | P |

The other modes of Bayer Pattern Subsampling are simple rearrangements of the component positions as illustrated in Tables 14–16 below.

TABLE 14

Scale 3: Bayer Pattern Subsampling Mode 2

| P | Q | P | Q |
|---|---|---|---|
| S | P | S | P |
| P | Q | P | Q |
| S | P | S | P |

TABLE 15

Scale 3: Bayer Pattern Subsampling Mode 3

| S | P | S | P |
|---|---|---|---|
| P | Q | P | Q |
| S | P | S | P |
| P | Q | P | Q |

TABLE 16

Scale 3: Bayer Pattern Subsampling Mode 4

| Q | P | Q | P |
|---|---|---|---|
| P | S | P | S |
| Q | P | Q | P |
| P | S | P | S |

In scale 4, the number of pixels is decreased. If the size of each pixel in a display remains the same, the overall size of the displayed image will be smaller at scale 4. If the overall image size of the display is not reduced, then each pixel at scale 4 represents a larger area of the image. The color components are represented in the 4:4:4 pattern of scale 0. In scale 4, an original image $I_{M \times N}$ of M×N pixels is first scaled down by a factor of L horizontally and vertically into an image $I_{m \times n}$ of size m×n, where $$m=(M+L-1)/L, n=(N+L-1)/L$$

Then, $I_{m \times n}$ is represented in 4:4:4 format. In most implementations, L is selected as 2 or 3.

Many algorithms can be used to scale down $I_{M \times N}$ horizontally and vertically by a factor of L, including, but not restricted to, decimation, bilinear, and bicubic scaling. Decimation scaling down methods keep only one pixel in every L×L pixel block with a regular spacing, while other scaling methods may compute the pixel representing a L×L pixel block from a neighborhood of pixels. Bilinear scaling interpolates the pixel value at a new position as a linear function of the horizontal and vertical coordinates. The coefficients of the function are either ad hoc or estimated from the neighboring, known pixel values. Similarly, in bicubic scaling, the interpolation function is a cubic function of the horizontal and vertical coordinates.

In scale 5, an image $I_{M \times N}$ of M×N pixels is scaled down by a factor of L horizontally and vertically into an image $I_{m \times n}$ of size m×n, as described above and subsampled in 4:2:2 format. Similarly, in scale 6: an image is scaled down by a factor of L horizontally and vertically and subsampled in 4:2:0 format. In a multi-scale representation of a compressed image, the same value or L, for example, a value of either 2 or 3, is typically used in scales 4 to 6, that is, scales 4 to 6 all refer to the same number of pixels.

The scaling-down and scaling-up algorithms are used in pairs, denoted by (L×↓,L×↑), where L is a scaling factor. and Lx defines the scaling algorithm. The optimal choice of particular scaling algorithm depends on the characteristics of the image data. By pairing, the same L is used for both scaling down (Lx↓) and scaling up (Lx↑). Scaling may be performed on some or all of the color components of an image, depending on the subsampling patterns and from which scale an image is subsampled.

To form a sequence of subsampled images, first, an original image I must be in one of the representations of Scales 0, 1, 2, and 3 described above. An image in the 4:2:2 pattern is obtained from an image in the 4:4:4 pattern with scaling down the UV or RB components by a factor of 2 along only the horizontal direction. This scaling down along the horizontal direction is performed by a 2x↓ algorithm. The vertical sizes of the YUV or RGB components are the same for a 4:4:4 pattern and a 4:2:2 pattern. Similarly, an image in the 4:2:0 pattern is obtained from an image in the 4:2:2 pattern by scaling down the UV or RB components by a factor of 2 along only the vertical direction. A Bayer pattern is obtained from a 4:2:0 image with scaling down the P component image horizontally or vertically, but not both.

Let G be the original scale of image I. Then I is represented by $I_G$ since I can be considered an image subsampled from Scale 0. From $I_G$, we can use the Lx↓ algorithm to subsample $I_G$ to get $I_{G+1}$. From $I_{G+1}$, we again use the Lx↓ algorithm to subsample $I_{G+1}$ to get $I_{G+2}$, and so forth until we reach the Subsampling Quality Scale S. This way we get a sequence of subsampled images of $I_G$: $\{I_G, I_{G+1}, \ldots I_S\}$. Obviously, the SQS value S cannot be smaller than the original image scale G.

For example, assume G=2, and S=4. Then $I_2$ is in 4:2:0 format. From $I_G$, we use the decimation algorithm to reduce $I_2$ into one of the Bayer Patterns, $I_3$, as shown in Tables 13–16. Also, we use the given 2x↓ algorithm to scale down the P component of $I_2$ and reduce $I_2$ to $I_4$, which is in 4:4:4 format at a lower dimension. $I_4$ can also be obtained from $I_0$ directly with scaling down all color components using a given 2x↓ algorithm.

The color components in the Bayer Pattern are not co-sited. When subsampling a Bayer Pattern into a format of lower scale, care needs to be taken on pixel alignment. Therefore, the following two sequences of scales are particularly useful:

Sequence I: {0, 1, 2, 4, 5, 6}
Sequence II: {0, 1, 2, 3}

For SQS values less than 3, either Sequence I or Sequence II can be used. For an SQS value of 3, Sequence II is used. For SQS values greater than 3, Sequence I is used. In Sequence II, the decimation method is preferred in the subsampling at Scales 1 and 2. In Sequence I, Scale 3 is skipped in order to avoid the non-cositedness problem. More sophisticated scaling methods can be used for Sequence I.

A sequence of differential images may be defined differently for Sequences I and II. In the case of Sequence II, the subsampled sequence contains a subset of $\{I_0, I_1, I_2, I_3\}$. When the decimation method is used for subsampling, it is obvious that $I_{S+1}$ is a subset of $I_S$, for S=0, 1, 2. The differential image $D_S$ between $I_S$ and $I_{S+1}$, may be defined as the extra pixels or components present in $I_S$ but not in $I_{S+1}$. Thus, $D_S$ may be written as $$D_k = I_k - I_{k+1}, k=0, 1, 2,$$

For convenience, let $D_3 = I_3$. This way we obtain a sequence of differentially subsampled images:

$\{D_0, D_1, D_2, D_3\}$.

In the case of Sequence I, the subsampled sequence contains a subset of $\{I_0, I_1, I_2, I_4, I_5, I_6\}$. To obtain the differential images, we scale an image at lower scales up to a higher scale. For example, we use the given 2x↑ algorithm to scale the P components of $I_4$ to obtain a higher scale image $J_2$. Similarly, using the given 2x↑ algorithm we scale up the S and Q components of $I_k$ to obtain a higher scale image $J_{k-1}$, for k=6, 5, 2, 1. Then the differential image at scale k is defined as $$D_k = I_k - J_k, k=0, 1, 2, 4, 5$$

Let $D_6 = I_6$. Then the sequence of differentially subsampled images is given by $\{D_0, D_1, D_2, D_4, D_5, D_6\}$.

The differentiation method in Sequence I can also be applied Sequence II.

According to an aspect of the present invention, instead of the sequence of differentially subsampled images described above, the differential images produced at the differentiation stage 120 of FIG. 1 take a different form. The differential representation described above has the disadvantage of error propagation from the lowest quality scale to higher quality scales. To prevent error accumulation in the present differentiation process, the reference image used for subtraction needs to be replaced by an image reconstructed from the data of lower scales.

We consider here only the case of Sequence I. The case of Sequence II is simpler and can be similarly treated. Given an SQS S and a CQS C, first obtain the subsampled sequence $\{I_C, I_{C+1}, \ldots, I_S\}$. The base quality scale image $I_S$ is treated by a lossy transformation consisting of transform stage 130 and quantize stage 140. The transform stage 130 can be performed using the DCT or wavelet transforms, as used, respectively, in standard JPEG or JPEG2000 methods. Alternatively, transform stage 130 can use a new discrete cosine wavelet transform defined below in the present application.

Reconstructing $I_S$, by applying the inverse of the lossy transformation, we can obtain $G_S$. In general $G_S$ is different from $I_S$, because lossy processes were used at stages 130 and 140. Using the given Lx↑ algorithm, we scale up $G_S$ to a higher scale S−1 and obtain $H_{S-1}$. Then we obtain $D_{S-1}$ from $$D_{S-1} = I_{S-1} - H_{S-1} \qquad (1)$$

and $D_{S-1}$ is transformed and quantized. Let $D'_{S-1}$ represent the transformed and quantized $D_{S-1}$.

Reconstructing $D'_{S-1}$, by the inverse of stages 130 and 140, we obtain $G_{S-1}$. Again $G_{S-1}$ is in general different from $D_{S-1}$. From $G_{S-1}$ and $H_{S-1}$, we can reconstruct $I_{S-1}$ from $$F_{S-1} = G_{S-1} + H_{S-1} \qquad (2)$$

where the symbol $F_{S-1}$ is an approximation to the original image $I_{S-1}$ at scale S−1. Note that the difference between $F_{S-1}$ and $I_{S-1}$ is the same as the difference between $D_{S-1}$ and $G_{S-1}$, successfully preventing error propagation from scale S. Now, using the given 2x↑ algorithm, we scale up $F_{S-1}$ to a higher scale S−1 and obtain $H_{S-2}$. Then we obtain $D_{S-2}$ from $$D_{S-2} = I_{S-2} - H_{S-2}$$

Now $D_{S-2}$ is transformed and quantized to give $D'_{S-2}$ and from $D'_{S-2}$ we can obtain $G_{S-2}$. This process goes on until the differential image $D_C$ at the highest quality scale C is determined, transformed, and quantized. The quantity $H_k$ differs from $J_k$ defined above in that $H_k$ is reconstructed from lower scale image data transformed and quantized using lossy methods, while $J_k$ is an image scaled up from a lower quality scale image $I_{k+1}$.

The calculations described immediately above are illustrated in the flow diagram of FIG. 1. Subtract stage 125 computes the difference between a subsampled image and the reconstructed upscaled image as given explicitly for scale S−1 in Eq. (1). The output D' of quantize stage 140 is passed to both the ordered statistics encoding stage 180 and to the dequantize stage 150 to complete the process of determining the differentials. The output of the inverse transform stage 160 is the quantity denoted by G, that is the reconstructed D'. The add stage 165, adds the reconstructed differential G to the image scaled up from the adjacent lower scale H, as given explicitly for scale S−1 in Eq. (2). With the formal definitions for the base quality scale S of $D_S=I_S$ and $H_S=0$, the flow diagram describes the overall differentiation process, producing a sequence of transformed and quantized images $\{D'_S, D'_{S-1}, \ldots D'_C\}$ As indicated, the transform stage 130 may refer to standard transformations into coefficients associated with known functions such as the discrete cosine transform (DCT), wavelet transforms (WT), or other similar transforms known in the art. According to another aspect of the present invention, a novel transform, denoted the discrete wavelet cosine transform (DWCT), is used. The DWCT transform combines spatial transformation features of the Haar (wavelet) transform and frequency transformation features of the DCT.

In the following formulas, a bold face letter such as X or Y is used to represent a vector. A subscript is used to denote the dimension of the vector. For example, $X_N$ represents a vector of N elements, whose nth element is represented by $X_N[n]$. Round brackets (and) are used to enclose the variables of a function (e.g. f(x)), while square brackets [and] are used to enclose an index of a vector element (e.g., X[n]). We use F(X) to express a linear transform which can also be represented by a matrix multiplication FX, where F is the matrix form of the transform function F.

If $X_n=[x_0, x_1, \ldots x_{N-1}]^T$ and $Y_N=[x_0 y_1, \ldots, x_{N-1}, y_{N-1}]^T$ are two vectors of N elements, than an interleave function, Interleave($X_N, Y_N$), generates a vector of 2N elements, that is, $$\text{Interleave}(X_N, Y_N) = [x_0, y_0, x_1, y_1, \ldots, x_{N-1}, y_{N-1}]^T.$$

Given a vector $X_N=[x_0, x_1, \ldots, X_{N-1}]^T$, a permutation function $T_N(X_N)$ for size N is defined as $$T_N(X_N)=T_N([x_0, x_1, \ldots, x_{N-1}]^T)=[x_0, x_2, \ldots, x_{N-2}, x_{N-1}, \ldots, x_3, x_1]^T.$$

$T_N(X_N)$ is inversible and can be expressed in matrix form $$T_N(X_N)=T_N X_N$$

for some matrix $T_N$.

The DWCT is defined recursively. To clarify the relationship between the DWCT and the previously used DCT and wavelet transforms, first a recursive definition of the DCT is provided. For a 2-element vector $X_2$, the DCT transformation $C_2(X_2)$ is defined as $$Y_2 = C_2(X_2) = C_2 X_2 = \begin{bmatrix} 1 & 1 \\ \frac{1}{\sqrt{2}} & -\frac{1}{\sqrt{2}} \end{bmatrix} X_2,$$

Then the DCT of an N-element vector $X_N$, where N is an integral power of 2, can be expressed as $$Y_N=C_N(X_N)=C_N X_N,$$

where $C_N$ defines the one-dimensional DCT of size N. With the definitions $E_{N/2}$ and $O_{N/2}$ $$E_{N/2}[n]=Y_N[2n]\ O_{N/2}[n]=Y_N[2n+1],\ n=0,1,\ldots,N/2-1,$$

and $$Y_N=\text{Interleave}(E_{N/2}, O_{N/2}).$$

the DCT at size N can be recursively defined in terms of DCTs at size N/2 through $$E_{N/2}=C_{N/2}(U_{N/2})=C_{N/2}U_{N/2},$$

$$Q_{N/2}=C_{N/2}(V_{N/2})=C_{N/2}V_{N/2},$$

$$O_{N/2}[n]=Q_{N/2}[n]+Q_{N/2}[n+1],\ n=0,1,\ldots,N/2-1$$

with $$U_{N/2}[n]=(X_N[n]+X_N[N-n-1])/\sqrt{2},\ n=0,1,\ldots,N/2-1,$$

$$V_{N/2}[n]=(X_N[n]-X_N[N-n-1])/(2\sqrt{2}\cos[(2n+1)\pi/2N]),\ n=0,1,\ldots,N/2-1.$$

Note that $Q_{N/2}$ is a vector of only N/2 elements. To simplify the mathematics, $Q_{N/2}$ may be extended to contain N/2+1 elements with $Q_{N/2}[N/2]=0$. It is clear that $E_{N/2}[n]$, $Q_{N/2}[n]$, and therefore $C_N$ are defined by DCTs at a lower dimension N/2 instead of N.

The DCT kernel $C_N$ obtained with the recursive definition above is not normalized. To obtain a normalized DCT kernel, equivalent to the standard non-recursive definition of the DCT for a given dimension N, simply multiply the first row of $C_N$ by $1/\sqrt{2}$.

The Haar Transform (HT) may also be defined recursively. For a 2-element vector $X_2$, $H_2(X_2)$ is the same as DCT:

$$Y_2 = H_2(X_2) = H_2 X_2 = \begin{bmatrix} 1 & 1 \\ \frac{1}{\sqrt{2}} & -\frac{1}{\sqrt{2}} \end{bmatrix} X_2,$$

Then HT of an N-element vector $X_N$ can be expressed as $$Y_N=H_N(X_N)=H_N X_N,$$

where $H_N$ defines the one-dimensional HT of size N. With the definitions, $E_{N/2}$ and $O_{N/2}$ $$E_{N/2}[n]=Y_N[2n]\ O_{N/2}[n]=Y_N[2n+1],\ n=0,1,\ldots,N/2-1.$$

and $$Y_N=\text{Interleave}(E_{N/2}, O_{N/2}).$$

the HT at size N can be recursively defined in terms of HTs at size N/2 through $$E_{N/2}=H_{N/2}(U_{N/2})=H_{N/2}U_{N/2},$$

$$O_{N/2}=V_{N/2}$$

with $$U_{N/2}[n]=(X_N[2n]+X_N[2n+1])/\sqrt{2},\ n=0,1,\ldots,N/2-1$$

$$V_{N/2}[n]=(X_N[2n]-X_N[2n+1])/(\sqrt{2}),\ n=0,1,\ldots,N/2-1.$$

It is clear that $E_{N/2}[n]$ and therefore $H_N$ are defined by HTs at a lower dimension N/2 instead of N.

As in the recursive definition of the DCT, the HT kernel $H_N$ obtained above is not normalized. Multiplying the first row of $H_N$ by $1/\sqrt{2}$ provides the conventional normalized HT for a given dimension N.

The one-dimensional DWCT according to an aspect of the present invention is also defined recursively. First, the DWCT $W_2(X_2)$ at size 2 is defined to be the same as the DCT or HT:

$$Y_2 = W_2(X_2) = C_2(X_2) = H_2(X_2) = W_2X_2 = \begin{bmatrix} 1 & 1 \\ \frac{1}{\sqrt{2}} & -\frac{1}{\sqrt{2}} \end{bmatrix} X_2, \quad (3)$$

Next, the DWCT $W_N(X_N)$ at size N for N an integer power of 2 is defined as $$Y_N = W_N(X_N) = W_N X_N \quad (4)$$

Again, two vectors $E_{N/2}$ and $O_{N/2}$ are defined such that $$E_{N/2}[n] = Y_N[n], O_{N/2}[n] = Y_N[N+n], n=0,1,\ldots,N/2-1.$$

and $$Y_N = \begin{bmatrix} E_{N/2} \\ O_{N/2} \end{bmatrix}. \quad (5)$$

We still call $E_{N/2}$ and $O_{N/2}$ the even part and the odd part for convenience in comparing with the DCT and HT. However, it should be noted that in the DWCT, the even part and odd part are not interleaved, but are separated as shown in Eq. (5). Now the DWCT at size N can be recursively defined in terms of DWCTs at size N/2 through $$E_{N/2} = W_{N/2}(U_{N/2}) = W_{N/2} U_{N/2}, \quad (6)$$

$$Q_{N/2} = C_{N/2}(V_{N/2}) = C_{N/2} V_{N/2}, \quad (7)$$

$$O_{N/2}[n] = Q_{N/2}[n] + Q_{N/2}[n+1], n=0,1,\ldots,N/2-1 \quad (8)$$

with $$U_{N/2}[n] = (Z_N[n] + Z_N[N-n-1])/\sqrt{2}, \quad (9)$$
$$= (X_N[2n] + X_N[2n+1])/\sqrt{2}, n=0,1,\ldots,N/2-1,$$

$$V_{N/2}[n] = (Z_N[n] - Z_N[N-n-1])/(2\sqrt{2}\cos[(2n+1)\pi/2N]), \quad (10)$$
$$= (X_N[2n] - X_N[2n+1])/(2\sqrt{2}\cos[(2n+1)\pi/2N]),$$
$$n = 0,1,\ldots,N/2-1,$$
$$Z_N = T_N(X_N) = T_N(X_N).$$

Again, we assume $Q_{N/2}[N/2]=0$.

As in the recursive definitions of the DCT and the HT, the DWCT kernel $W_N$ defined here is not normalized. Multiplying the first row of $W_N$ by $1/\sqrt{2}$ provides a normalized DWCT kernel. However, there is no requirement that the DWCT transform be normalized. The quantization values used at the quantize stage 150, discussed further below, can be chosen taking into account whether or not the DWCT has been normalized.

Although $W_N(X_N)$ looks somewhat equivalent to the composite function $C_N(T_N(X_N))$, they are not the same. $T_N(X_N)$ permutes only $X_N$ at size N, while $W_N(X_N)$ permutes the data at each recursion. From one point of view, the DWCT may be thought of as a variant of the DCT in the sense DWCT is defined using the DCT and a permutation function. Permutation does not change the value of the input, but only the order of the input.

The discrete wavelet cosine transform takes its name from Eqs. (6)–(9). The even part, $E_{N/2}$, of the DWCT, as defined in Eqs. (6) and (9), is the same as the even part of the Haar Transform. From Eq. (5), it can be seen that the even part corresponds to the first part of the transformed vector $Y_N$. When written as column vector as in Eq. (5), the first part of the transformed vector is the top portion. The odd part, $O_{N/2}$, that is, the second portion of the vector $Y_N$, is based on the DCT, as seen from Eqs. (7) and (8). Therefore the DWCT differs from the HT only in the second part, which corresponds to high frequencies. The elements of the vector $Y_N$ are referred to as the DWCT coefficients. Actually, DWCT coefficients can be derived from HT coefficients with some additional computations on the odd part and vice versa. Thus, the DWCT is a multi-resolution representation of the data with the first part of the data containing the lower scales of representation of the input. In a general sense, the DWCT is a wavelet transform because at each recursion, DWCT can be considered a scaled Haar transform. The end result is a compact representation in which the lowest order coefficients have the most information about the image. The arrangement of $E_{N/2}$ before $O_{N/2}$ in Eq.(5) is convenient but arbitrary; the important point is that the DWCT divides the coefficients into two parts, one part corresponding to lower scales of representation of the input and the other part corresponding to the high frequency components of the input.

While the DWCT is defined here in the context of the present data compression process in which differential images are defined from reconstructed representations, the DWCT may be applied in any data compression method. For example, alternate data compression methods could be defined in which DWCT replaces the DCT or wavelet transforms of JPEG or JPEG2000, respectively.

Obviously, the inverse of $W_N(X_N)$ exists and it can be proven that $$W_N(X_N) = W_N X_N$$

for some reversible matrix $W_N$ of size N×N.

The manner in which the recursive definition of the DWCT is applied to obtain the transform $W_N(X_N)$ for dimension N from the definition in Eq. (3) of $W_2$ may be understood from the case of N=4. Applying Eqs. (9) and (10) to a vector $X_4$ gives two vectors of length 2. Using $W_2$ from Eq. (3), Eqs. (5)–(8) can be evaluated to give $Y_4$, which according to Eq. (4), is the desired DWCT applied to the original vector $X_4$. For general $N=2^n$, Eqs. (9) and (10) are evaluated repeatedly until $2^{n-1}$ vectors of length 2 are obtained. In practice, the recursive definition, Eqs, (3)–(10) can be evaluated each time the DWCT transform is calculated. Alternatively, the transformation matrices $W_N$ can be determined explicitly as a function of N, from the original $X_N$ and Eq. (4), and stored. The recursive definition has the advantage of being applicable to any value of N. A recursive definition of the inverse of the DWCT, which may be denoted IDWCT, may be derived mathematically from Eqs. (3)–(10) since all the equations are linear. Alternatively, in some implementations, the inverse transformation may be calculated explicitly from the forward transformation and stored.

The two-dimensional DWCT of an array $X_{N\times M}$ ($N=2^n$, $M=2^m$), is defined as $$Z_{N\times M} = \{W_M\{W_N(X_{N\times M})\}^T\}^T$$

First the transform is applied to the rows of the two-dimensional array, treating each row as a one-dimensional vector, and then the transform is applied to the columns of the array, again treating each column as a one-dimensional vector. The DWCT is applied to each color component separately. That is, each color component is extracted as a monochromatic component image and then the DWCT is applied to each of the component images.

In the case that the length of an image is not an even power of 2, according to another aspect of the present invention, a low-frequency extension method is applied. First consider the one-dimensional case. A vector $X_L = \{x_0, x_1, \ldots, x_{L-1}\}^T$, with $2^{n-1} < L < 2^n$ may be extended to a vector $X_N$ of size $N=2^n$ by adding $2^n - L$ elements $x_L, x_{L+1}, \ldots, x_{N-1}$ to $X_L$. These added elements can have any values because they will be discarded by the decoder. The present low frequency extension is to choose the values of $x_L, x_{L+1}, \ldots, x_{N-1}$ to make the DWCT transform of $X_N$ have only up to $L$ non-zero coefficients.

Consider the inverse DWCT of $X_N$ $$X_N = \begin{bmatrix} X_L \\ X_{(N-L)} \end{bmatrix} = W_N^{-1}(Z_N) = W_N^{-1} Z_N = \begin{bmatrix} w_{L \times L} & w_{L \times (N-L)} \\ w_{(N-L) \times L} & w_{(N-L) \times (N-L)} \end{bmatrix} \begin{bmatrix} Z_L \\ Z_{(N-L)} \end{bmatrix}$$

By setting $Z_{(N-L)}$ to zero, the following equations result $$X_L = w_{L \times L} Z_L, \text{ or } Z_L = w_{L \times L}^{-1} X_L$$

$$X_{(N-L)} = w_{(N-L) \times L} Z_L = w_{(N-L) \times L} w_{L \times L}^{-1} X_L$$

$X_{(N-L)}$ in the above equation provides a low-frequency extension to the original data $X_L$. The two-dimensional case is treated by considering the column vectors first and then row vectors of the transformed image (by transposing the image). In the two-dimensional case, elements are added to a block of dimension J×K, where J and K are not integral multiples of 2, such that the block of coefficients, after transformation, have at most J×K non-zero values. The same principle can be applied to any other transform such as the DCT, Fourier Transform, or wavelet transform.

In order to reduce the computation of the DWCT, the original image may be divided into blocks and DWCT can be performed on each block instead of the whole image. Again we consider first the one-dimensional case. First, choose a block size $M=2^m$. Then the given Vector $X_L$ is divided into $(L+M-1)/M$ blocks. The last block may be filled only partially with image data. In this case, the low-frequency extension method described above can be used to fill the rest of the block. Extension to the two-dimensional case by dividing the image into blocks of size M×M pixels is straightforward. Block division is applied to the composite color image altogether so that all component images share the same overlapped block boundaries. Typically, block size must be at least 8×8 in order to achieve good results. Block sizes of 8×8 or 16×16 are reasonable choices for practical implementation of the DWCT, although block sizes can be selected to be much larger. However, computational resource requirement increases significantly when block sizes increase. Conventional wavelet transforms frequently use large block sizes, up to the size of the whole image for best quality. One advantage of the present DWCT is to provide the benefits of wavelet transforms without requiring use of the largest block sizes.

The process of dividing an image into blocks is equally applicable to alternative transforms used at stage 130. Referring to the flow diagram of FIG. 1, the image may be divided into blocks immediately before the transform stage 130 such that the transform process 130 and quantize process 140 are then performed in terms of blocks. In completing the loop within the differentiation stage 120, a blocked image is deblocked immediately after the inverse transform at stage 160.

At the quantization stage 140, a block of coefficients is quantized to fixed-point data by dividing each coefficient with a quantizer and rounding the result to the nearest integer. The quantizers can be freely chosen according to application needs. The DWCT, or other transform, of an M×M block image yields a block of M×M coefficients. As noted above, block may refer to the entire image. The collection of quantizers for the coefficients in a block forms a quantizer block, called a quantization table. The structure of a quantizer block is shown in Table 17.

TABLE 17

| Quantization Coefficients | | | |
|---|---|---|---|
| $Q_{0,0}$ | $Q_{0,1}$ | ... | $Q_{0,M-1}$ |
| $Q_{1,0}$ | $Q_{1,1}$ | | |
| ... | | | |
| $Q_{M-1,0}$ | | ... | $Q_{M-1,M-1}$ |

Let $C(x,y)$ be, for example, the DWCT coefficients of an image block and $Q(x,y)$ be the selected quantizer block. The quantization process is described by the following equation:

$$D(x, y) = [C(x, y)/Q(x, y)]$$

where [X] denotes the operation of rounding a number X into an integer.

The values of the quantization coefficients $Q(x,y)$ determine the precision with which the tranformed coefficients are stored, the highest precision being the precision of the data prior to transformation. Increasing the values chosen for $Q(x,y)$, decreases the number of bits stored per coefficient. A convenient rule of thumb is that for a tranform of dimension N×N, a minimum practical value of $Q(x,y)$ is N. If an un-normalized transform was used, the values of the first row of the quantization table, $Q(0,y)$, can be chosen to compensate for the fact that the first row of transformed coefficients was not normalized. In some embodiments, a fixed number of quantizer tables are used in a given image such that a different coefficient block may use a different quantization table. For the coefficient blocks corresponding to the highest frequency coefficients, much larger quantizer values, for example, values on the order of 500, may be used.

At the dequantization stage 150, integer values are multiplied by the values in the quantization tables. Alternatively dequantize stage 150 uses an inverse quantization table.

In the ordered statistics encoding stage 180, the quantized coefficients for each block are encoded in a lossless manner executed in three stages: context prediction 185, ordering 190, and entropy encoding 195.

Conventional methods of context prediction may be used at stage 185. According to another aspect of the present invention, an improved method of context prediction uses a context that is different for each color component and for each coefficient. For the primary color component P, the context consists of neighboring pixels in the same block. For the second color component S, the context consists of neighboring coefficients in the same block and the coefficient of the same index in the corresponding primary color block. For the third color component Q, the context consists of neighboring coefficients in the same block and the coefficients of the same index in the corresponding primary and second color blocks.

Coefficients of index 0 are predicted differently, utilizing the coefficients of index 0 in the neighboring blocks in addition to the same coefficients in the primary or second color components. A context of any order can be used;

however, typically, orders 2 and 3 are used. An order 3 context is formed by three coefficients $C_1$, $C_2$, and $C_3$ from the same or different blocks. An order 2 context contains $C_1$ and $C_2$ only. The context described below is for order 3. The order 2 context is obtained by discarding one coefficient, usually the least relevant one, in the context.

The coefficients in a block are classified into 4 groups. The context for each group is formed using different rules:

Group 0: Group 0 contains the coefficient at location (0,0) only.

Group 1: Group 1 contains the coefficients on the first row except coefficient (0,0). This group of coefficients has an index represented by (0,i), with i>0.

Group 2: Group 2 contains the coefficients on the first column except coefficient (0,0). This group of coefficients has an index represented by (j,0), with j>0.

Group 3: Group 3 contains all the rest of the coefficients. This group of coefficients have an index represented by (i,j), with i>0, j>0.

The context of a primary color coefficient $P_{0,i}$ (i>0) in Group 1 is formed by the 3 coefficients on the same row preceding $P_{0,i}$:

$$C_k = P_{0,i-k}, k=1, 2, 3.$$

If $C_3$ or $C_2$ is out of the block, then the context is formed by $C_1$ only. Similarly, the context of a coefficient $P_{j,0}$ in Group 2 is formed by the 3 coefficients on the same column preceding $P_{j,0}$. If $C_3$ or $C_2$ is out of the block, then the context is formed by $C_1$ only. The context of a coefficient $P_{j,i}$ in Group 3 is formed by the 3 neighboring coefficients on the upper left side of $P_{j,i}$:

$$C_1 = P_{j,i-1}, C_2 = P_{j-1,i}, C_3 = P_{j-1,i-1}.$$

Figure 3:
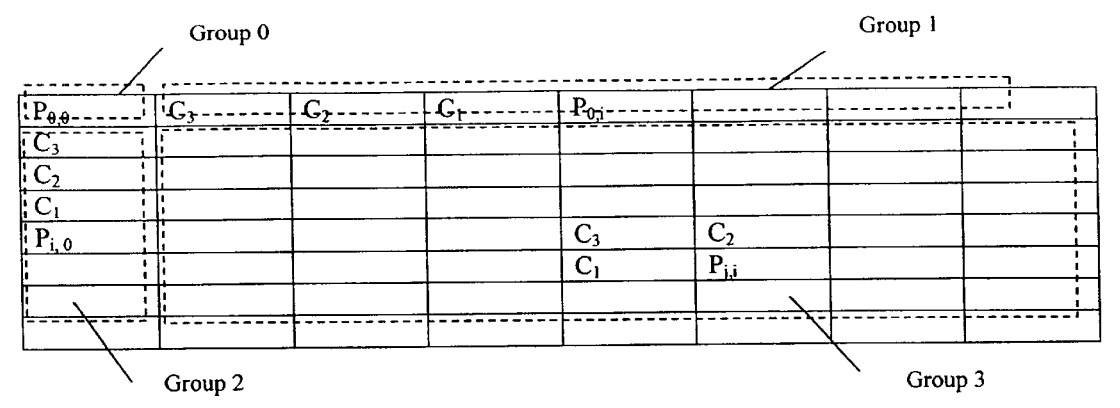

The locations of Groups 0, 1, 2, and 3 in a block of coefficients are illustrated schematically in FIG. 3.

The context for coefficient (0,0) is formed differently. First, all coefficients (0,0) from different blocks of the primary color are grouped together to form an index image. The index image is treated like a regular primary component block and DWCT is applied to the index image to obtain a coefficient block. The Groups 1, 2, and 3 are predicted using the context described above. The coefficient at position (0,0) is predicted using a constant $2^{H-1}$ for an image of H-bits precision.

The context of a coefficient of a second color component $S_{0,i}$ (i>0) in Group 1 is formed by the 2 coefficients on the same row preceding $S_{0,1}$ and the corresponding primary coefficient $P_{0,i}$:

$$C_1 = P_{0,i}, C_2 = S_{0,i-1}, C_3 = S_{0,i-2}.$$

If $C_3$ is out of the block, then the context is formed by $C_1$ and $C_2$ only. Similarly, the context of a coefficient $S_{j,0}$ in Group 2 is formed by the two coefficients on the same column preceding $S_{j,0}$ and the corresponding primary coefficient $P_{0,i}$:

$$C_1 = P_{j,0}, C_2 = S_{0,i-1}, C_3 = S_{0,i-2}.$$

If $C_3$ is out of the block, then the context is formed by $C_1$ and $C_2$ only. The context of a coefficient $S_{j,i}$ in Group 3 is formed by the 2 neighboring coefficients on the left and top sides of $S_{j,i}$ and the corresponding primary coefficient $P_{j,i}$:

$$C_1 = P_{j,i}, C_2 = S_{j,i-1}, C_3 = S_{j-1,i}.$$

The context for coefficient (0,0) of the second color component S is formed analogously to the context for coefficient (0,0) of the primary color component. First, all coefficients (0,0) from different blocks of the second color are grouped together to form an index image. This index image is treated like a regular second component block and DWCT is applied to this index image to obtain a coefficient block. The Groups 1, 2, and 3 are predicted using the context described above for the second component. Coefficient 0 is predicted using a constant $2^{H-1}$ for an image of H-bits precision.

The context of a coefficient of the third color component $Q_{0,i}$ (i>0) in Group 1 is formed by the coefficient on the same row preceding $S_{0,i}$ and the corresponding primary and second coefficients $P_{0,i}$ and $S_{0,i}$:

$$C_1 = P_{0,i}, C_2 = S_{0,1}, C_3 = Q_{0,i-1}.$$

Similarly, the context of a coefficient $Q_{j,0}$ in Group 2 is formed by the coefficient on the same column preceding $Q_{j,0}$ and the corresponding primary and second coefficients $P_{j,0}$ and $S_{j,0}$:

$$C_1 = P_{j,0}, C_2 = S_{j,0}, C_3 = Q_{j-1,0}.$$

The context of a coefficient $Q_{j,i}$ in Group 3 is formed by the two neighboring coefficients on the left side of $Q_{j,i}$ and the corresponding primary and second coefficients $P_{j,i}$ and $S_{j,i}$:

$$C_1 = P_{j,i}, C_2 = S_{j,i}, C_3 = Q_{j,i-1}.$$

The context for coefficient (0,0) of the third color component is formed analogously to the process described above for the (0,0) coefficients of the primary and second color components.

In addition to the context from neighboring pixels, the positional index of each coefficient in a DWCT block can also be used as a context. The positional context is denoted by $C_0$.

Note that color components of an image in some quality scales, for example in scale 4, Bayer pattern subsampling, are not co-sited. In this case, a pixel of one color may not find corresponding pixels of other colors in the same location, leading to the effect that color blocks may not be aligned and may not even have the same block size. The block size problem can be handled by using only the subblock of the primary coefficients in the upper left corner for generating context for secondary colors. Alternatively, the misalignment problem can be overlooked. It may be further noted that the context prediction method described here may be applied in any data compression method. For example, the present context prediction method may be used in conjunction with entropy encoding steps in a JPEG- or JPEG2000-like method.

The pixel context and positional context together form the whole context for probability modeling. The whole context is denoted by $C_3C_2C_1C_0$. For a coefficient X, the conditional probability $P(C_3C_2C_1C_0|X)$ is used subsequently at stage 195 to encode the coefficient X. The maximum order of the context may be reduced from 4 to 3 or 2 for computational reasons in practical applications.

At the ordering stage 190, the two-dimensional array of pixels is mapped into a one-dimensional sequence for the purpose of efficient encoding. In the flow diagram of FIG. 1, ordering follows context prediction. Alternatively, ordering can be done before quantization or context prediction as long as the mapping is preserved for all relevant data such as coefficients, quantization tables, and contexts. Conventional methods of ordering include the zig-zag ordering scheme used in JPEG. According to another aspect of the present invention, an ordering method termed quad-tree ordering is defined here. The quad-tree ordering method is particularly suited to take advantage of the data compaction of the DWCT transform which places the most important coefficients at the upper left corner of the two-dimensional array. First, each block is partitioned into four priority regions (PRs) of equal sizes as shown in Table 18.

TABLE 18

| Priority Regions | |
|---|---|
| 0 | 1 |
| 2 | 3 |

Priority 0 is the region of highest priority and Priority 3 is the region of lowest priority. In the bitstream, regions of Priority 0 appears ahead of regions of Priority 1, followed by regions of Priority 2 and then 3.

Each region is further partitioned into sub priority regions using the same method as shown above. This process continues until the region size reaches 1 pixel by 1 pixel. Table 19 shows the ordering result for a block of size 16×16. The same method can be applied to any sized block.

TABLE 19

Quad-tree Ordering of Block Coefficients

| 0 | 1 | 4 | 5 | 16 | 17 | 20 | 21 | 64 | 65 | 68 | 69 | 80 | 81 | 84 | 85 |
|---|---|---|---|---|---|---|---|---|---|---|---|---|---|---|---|
| 2 | 3 | 6 | 7 | 18 | 19 | 22 | 23 | 66 | 67 | 70 | 71 | 82 | 83 | 86 | 87 |
| 8 | 9 | 12 | 13 | 24 | 25 | 28 | 29 | 72 | 73 | 76 | 77 | 88 | 89 | 92 | 93 |
| 10 | 11 | 14 | 15 | 26 | 27 | 30 | 31 | 74 | 75 | 78 | 79 | 90 | 91 | 94 | 95 |
| 32 | 33 | 36 | 37 | 48 | 49 | 52 | 53 | 96 | 97 | 100 | 101 | 112 | 113 | 116 | 117 |
| 34 | 35 | 38 | 39 | 50 | 51 | 54 | 55 | 98 | 99 | 102 | 103 | 114 | 115 | 118 | 119 |
| 40 | 41 | 44 | 45 | 56 | 57 | 60 | 61 | 104 | 105 | 108 | 109 | 120 | 121 | 124 | 125 |
| 42 | 43 | 46 | 47 | 58 | 59 | 62 | 63 | 106 | 107 | 110 | 111 | 122 | 123 | 126 | 127 |
| 128 | 129 | 132 | 133 | 144 | 145 | 148 | 149 | 192 | 193 | 196 | 197 | 208 | 209 | 212 | 213 |
| 130 | 131 | 134 | 135 | 146 | 147 | 150 | 151 | 194 | 195 | 198 | 199 | 210 | 211 | 214 | 215 |
| 136 | 137 | 140 | 141 | 152 | 153 | 156 | 157 | 200 | 201 | 204 | 205 | 216 | 217 | 220 | 221 |
| 138 | 139 | 142 | 143 | 154 | 155 | 158 | 159 | 202 | 203 | 206 | 207 | 218 | 219 | 222 | 223 |
| 160 | 161 | 164 | 165 | 176 | 177 | 180 | 181 | 224 | 225 | 228 | 229 | 240 | 241 | 244 | 245 |
| 162 | 163 | 166 | 167 | 178 | 179 | 182 | 183 | 226 | 227 | 230 | 231 | 242 | 243 | 246 | 247 |
| 168 | 169 | 172 | 173 | 184 | 185 | 188 | 189 | 232 | 233 | 236 | 237 | 248 | 249 | 252 | 253 |
| 170 | 171 | 174 | 175 | 186 | 187 | 190 | 191 | 234 | 235 | 238 | 239 | 250 | 251 | 254 | 255 |

The output of the ordering method includes a table relating the two index pixel position to the coefficient order in the one-dimensional array as illustrated above.

The final stage of the data compression method is entropy encoding 195. The ordered, quantized coefficients are entropy encoded based on the conditional probability based on the context determined in stage 185. Any lossless encoding method may be used but arithmetic encoding is preferred. Standard methods of arithmetic encoding are described, for example, in the reference book by Mark Nelson and Jean-Loup Gailly, *The Data Compression Book* (M&T Books, 1995).

The conditional probability $P(C_3C_2C_1C_0|X)$, where X is the coefficient to be encoded, is initialized from a constant table obtained a priori and then updated using accumulated statistics for the image of interest. Note that $C_0$ is the positional index in the one-dimensional array resulting from the ordering stage. If X is not in the prediction table of $C_3C_2C_1C_0$, the prediction order is reduced to 3 and the prediction table of $C_2C_1C_0$ is examined. If X is in the prediction table of $C_2C_1C_0$, then $P(C_2C_1C_0|X)$ is used to encode X. Otherwise, the order is reduced to 2 and the prediction table of $C_1C_0$ is examined. The process continues until order 1 is reached. If again X is not in the prediction table of $C_0$, then X is encoded assuming a uniform probability for the values not in the prediction tables of $C_3C_2C_1C_0$, $C_2C_1C_0$, $C_1C_0$, and $C_0$.

A value to be encoded is called a symbol. The prediction tables for different orders are disjoint, as they contain no common symbols. For example, if X is not in the prediction table of $C_3C_2C_1C_0$, then when we reduce the order from 4 to 3, all symbols in $C_3C_2C_1C_0$ should be removed from the prediction table of $C_2C_1C_0$ when computing its symbol probabilities. Similarly, when we reduce the order from 3 to 2 (because X is not in the prediction table of $C_2C_1C_0$), all symbols in $C_3C_2C_1C_0$ and $C_2C_1C_0$ should be removed from the prediction table of $C_1C_0$ when computing its symbol probabilities. In the coding process, each conditional probability is represented by an occurrence count in fixed-point number format. The occurrence count is updated each time a value is encoded.

The encoding stage completes the process of producing a bitstream that can be efficiently stored or transmitted over a computer network. The bitstream contains the encoded coefficients corresponding to the base quality scale image followed by the encoded coefficients corresponding to the differential images. In addition, the bitstream may contain conventional header information such as the size of the file, number of colors, number of scales, information about how the file is ordered, such as a block sequential index, identification of methods used, for example to transform and encode, non-default quantization tables, and optionally, probability tables.

As described in FIG. 2, a decompression process essentially reverses the operation at each step of the process and thus enables the image to be reconstructed. The decompression process needs to have access to the probability tables used for entropy encoding. Although the probability tables may be stored as part of the header information, they are generally large. Therefore, at stage 210, the probability prediction tables are typically generated by an analogous context prediction process as that used at stage 185. However, the context prediction process used information about neighboring pixels. The portion of the decompression process indicated by loop 280, which reverses the ordered statistics encoding, is performed as a loop over pixel positions to gradually build up the probability tables. At the entropy decode stage, the bitstream data is restored to the quantized transform coefficients. The reverse order stage 230, maps the one-dimensional coefficient data back into the two-dimensional position. The dequantize stage 250 reverses the quantization process using an inverse quantization table. The inverse transform stage 260 transforms the dequantized coefficients back into the pixel data. Note that stages 250 and 260 use precisely the same processes as stages 150 and 160, used in the loop within the differentiation stage 120.

As displayed in FIG. 2, the recombination process 290 reverses the effects of the differentiation process 120. The output of the inverse transform stage 260 may be the sequence of differential images starting with the base quality scale image $G_S$ denoted as $\{G_S, G_{S-1}, \ldots G_C\}$ where the G's are not exactly the same as the original images $I_S$ etc. since they have undergone lossy transformations. $G_S$ is scaled up to yield a higher scale image $H_{S-1}$. The reconstructed $F_{S-1}$, the approximation to $I_{S-1}$, is obtained from Eq. (2) above, $F_{S-1}=G_{S-1}+H_{S-1}$. The image $F_{S-1}$ is scaled up to the next image scale to give $H_{S-2}$ and the process is continued until the digital representation of the highest quality scale image is recovered. With the formal definition $H_S=0$, the recombination process 290 is described in the flow diagram in FIG. 2 where the add stage 265 adds the reconstructed differential G to the image scaled up from the adjacent lower scale H as in Eq. (2).

However, it is not necessary to obtain a reconstructed image at the highest quality scale available in the compressed data. If a Display Quality Scale (DQS), the scale specified by an application, is of lower quality than the quality at which the image was stored, only the differentials corresponding to the DQS scale need to be recovered. In that case, alternatively, the flow of the processes in FIG. 2 can be altered so that the differentials G are obtained one at a time, from stages 210 through 260, and added to the previous upscaled image before the differential at the next quality scale is inverse transformed. In this way all the information needed to display an image at a given quality scale may be determined before any information required for the next higher quality scale is computed.

Thus, an image compressed according to the present process can be progressively viewed or downloaded by transmission over a computer network or the Internet. Further, a browser can display an image at a specified quality scale, ignoring any data corresponding to quality scales higher than the specified scale.

Although the digital image compression process has been described with respect to specific scale definitions, transformations and ordering schemes, the description is only an example of the invention's application. Various adaptations and modifications of the processes disclosed are contemplated within the scope of the invention as defined by the following claims.

I claim:

1. A method of compressing a digital representation of an image into a one-dimensional bitstream, the digital representation comprising a two-dimensional array of pixels wherein a primary color component and secondary color components are associated with each pixel, the method comprising:

representing the image in a series of quality scales of progressively decreasing quality, wherein a higher quality scale comprises more data than a lower quality scale, and wherein lower quality scales are formed from higher quality scales by decreasing the number of stored color components or by decreasing the number of pixels;

representing the image in terms of quality scales in terms of a base quality scale image and differential images wherein a differential image at a given quality scale is the difference between the image at the given quality scale and a representation of the image scaled up from a reconstructed representation at the adjacent lower quality scale, the reconstructed representation determined by a process comprising:

transforming the image into a set of coefficients associated with known functions, quantizing the set of coefficients by dividing by quantization values and rounding to integer values, dequantizing the set of quantized coefficients by multiplying by the quantization values, and performing the inverse transform associated with the known functions to produce a reconstructed representation;

representing the base quality scale image and the differential images as integer values by a process comprising transforming to a set of coefficients associated with known functions and quantizing the set of coefficients by dividing by quantization values and rounding to integer values; and encoding the integer values corresponding to the lowest quality scale and the differential images by a lossless ordered statistics encoding process to produce a one-dimensional bitstream.

2. The method of claim 1 wherein the primary color component is green and the secondary color components are red and blue.

3. The method of claim 1 wherein the primary color component is luminance and the secondary color components are chrominances.

4. The method of claim 1 wherein the series of quality scales comprises quality scales selected from the group consisting of a first quality scale wherein all color components are present at each pixel; a second quality scale wherein the primary color component and one secondary color component are present at each pixel; a third quality scale wherein a primary color component is present at each pixel and quadruple as many primary color components as each secondary color component are present; a fourth quality scale wherein one color component is present at each pixel and twice as many primary components as secondary components are present; a fifth quality scale derived from the first quality scale by reducing the number of pixels in the horizontal direction and in the vertical direction by dividing each dimension by an integral factor; a sixth quality scale derived from the fourth quality scale, wherein the primary color component and one secondary color component are present at each pixel; and a sixth quality scale derived from the fourth quality scale, wherein a primary color component is present at each pixel and quadruple as many primary color components as each secondary color component are present.

5. The method of claim 1 wherein transforming to a set of coefficients associated with known functions is applying a two-dimensional transform, the two-dimensional transform combining frequency transform features and multi-resolution transform features.

6. The method of claim 5 wherein applying the two-dimensional transform comprises applying a one-dimensional transform to rows of the two-dimensional array of pixels and applying the one-dimensional transform to columns of the two-dimensional array of pixels.

7. The method of claim 6 wherein the one-dimensional transform is defined from a discrete cosine transform and a permutation function whereby the output elements of the transform are separated into a first portion and a second portion, the first portion containing lower scales of representation of input to the transform.

8. The method of claim 7 wherein the one-dimensional transform is defined recursively.

9. The method of claim 8 wherein the one-dimensional transform is the discrete wavelet cosine transform.

10. The method of claim 1 further comprising dividing the lowest quality scale representation and the differential images into blocks of dimension M by M wherein M is an integral power of 2 before transforming to a set of coefficients.

11. The method of claim 10 further comprising forming a block of dimension M by M from a block of dimension J by K, wherein J and K are not integral powers of 2, by adding elements to the block of dimension J by K such that the set of coefficients after transformation has at most J×K nonzero values.

12. The method of claim 1 wherein the lossless ordered statistics encoding process comprises context prediction of quantized coefficients, ordering, and arithmetic encoding, wherein context prediction is performed separately for each color component, and wherein for the primary color component, the context comprises a positional index and neighboring coefficients of primary color pixels, for a first secondary color component, the context comprises a positional index, coefficients of neighboring first secondary color components, and the coefficient of the primary color component of the same positional index, and for a second secondary color component, the context comprises a positional index, neighboring second secondary color coefficients, and the coefficients of the primary and first secondary color components of the same positional index.

13. The method of claim 12 wherein context prediction divides the quantized coefficients into groups, wherein a first group comprises the coefficient corresponding to a lowest positional index, a second group comprises a first row of coefficients excluding the first group coefficient, a third group comprises a first column of coefficients excluding the first group coefficient, and a fourth group comprises the remaining coefficients, and wherein the context is different for each group.

14. The method of claim 5 wherein the lossless ordered statistics encoding process comprises context prediction, ordering the two-dimensional array of pixels into a one-dimensional array, and arithmetic encoding, wherein ordering comprises partitioning the two-dimensional array into four equally sized regions ordered as upper left, upper right, lower left, and lower right, and repeatedly partitioning each region into four equally sized subregions ordered as upper left, upper right, lower left, and lower right until a subregion is one pixel by one pixel in size.

15. A method of reconstructing a digital representation of an image compressed by the method of claim 1, the reconstruction method comprising:
  recovering context prediction probability tables used in compression;
  decoding integer values corresponding to the base quality scale representation and the differential images;
  reverse ordering each decoded integer value to a two-dimensional position in an array of pixels;
  multiplying each decoded integer value corresponding to the base quality scale and the differential images by the quantization value;
  performing the inverse transform associated with the known functions to reconstruct the digital representation of the base quality scale and the differential images;
  upscaling the digital representation of an image at a lower quality scale to the next higher quality scale; and
  adding a differential image at a given quality scale to the upscaled image at the given quality scale to reconstruct the digital representation at the given quality scale.

16. The method of claim 15 wherein for a primary color component, a context used in context prediction tables comprises a positional index and neighboring coefficients of primary color pixels, for a first secondary color component, a context comprises a positional index, coefficients of neighboring first secondary color components, and the coefficient of the primary color component of the same positional index, and for a second secondary color component, a context comprises a positional index, neighboring second secondary color coefficients, and the coefficients of the primary and first secondary color components of the same positional index.

17. The method of claim 16 wherein context prediction tables are associated with quantized coefficients considered in groups, wherein a first group comprises the coefficient corresponding to a lowest positional index, a second group comprises a first row of coefficients excluding the first group coefficient, a third group comprises a first column of coefficients excluding the first group coefficient, and a fourth group comprises the remaining coefficients, and wherein the context is different for each group.

18. The method of claim 15 wherein the inverse transform associated with the known functions is the inverse of a transform combining frequency transform features and multi-resolution transform features.

19. The method of claim 18 wherein the inverse transform is defined recursively from an inverse discrete cosine transform and a permutation function, and wherein the input elements of the inverse transform are separated into a first portion and a second portion, the first portion containing lower scales of representation of input to the transform.

20. The method of claim 19 wherein the inverse transform is an inverse discrete wavelet transform.

21. An apparatus comprising instructions for performing a method of compressing a digital representation of an image into a one-dimensional bitstream, the digital representation comprising a two-dimensional array of pixels wherein a primary color component and secondary color components are associated with each pixel, the method comprising:
  representing the image in a series of quality scales of progressively decreasing quality, wherein a higher quality scale comprises more data than a lower quality scale, and wherein lower quality scales are formed from higher quality scales by decreasing the number of stored color components or by decreasing the number of pixels;
  representing the image in terms of quality scales in terms of a base quality scale image and differential images wherein a differential image at a given quality scale is the difference between the image at the given quality scale and a representation of the image scaled up from a reconstructed representation at the adjacent lower quality scale, the reconstructed representation determined by a process comprising;
    transforming the image into a set of coefficients associated with known functions,
    quantizing the set of coefficients by dividing by quantization values and rounding to integer values,
    dequantizing the set of quantized coefficients by multiplying by the quantization values, and
    performing the inverse transform associated with the known functions to produce a reconstructed representation;
  representing the base quality scale image and the differential images as integer values by a process comprising transforming to a set of coefficients associated with known functions and quantizing the set of coefficients by dividing by quantization values and rounding to integer values; and encoding the integer values corresponding to the lowest quality scale representation and the differential images by a lossless ordered statistics encoding process to produce a one-dimensional bitstream.

22. The apparatus of claim 21 wherein transforming to a set of coefficients associated with known functions is applying a transform defined recursively from a discrete cosine transform and a permutation function whereby the output elements of the transform are separated into a first portion and a second portion, the first portion containing lower scales of representation of input to the transform.

23. The apparatus of claim 22 wherein the transform is a discrete wavelet cosine transform.

24. The apparatus of claim 21 wherein the lossless ordered statistics encoding process comprises context prediction of quantized coefficients, ordering, and arithmetic encoding, wherein context prediction is performed separately for each color component, and wherein for the primary color component, the context comprises a positional index and neighboring coefficients of primary color pixels, for a first secondary color component, the context comprises a positional index, coefficients of neighboring first secondary color components, and the coefficient of the primary color component of the same positional index, and for a second secondary color component, the context comprises a positional index, neighboring second secondary color coefficients, and the coefficients of the primary and first secondary color components of the same positional index.

25. The apparatus of claim 24 wherein context prediction divides the quantized coefficients into groups, wherein a first group comprises the coefficient corresponding to a lowest positional index, a second group comprises a first row of coefficients excluding the first group coefficient, a third group comprises a first column of coefficients excluding the first group coefficient, and a fourth group comprises the remaining coefficients, and wherein the context is different for each group.

26. An apparatus comprising instructions for reconstructing a digital representation of an image compressed by the method of claim 1, the instructions comprising instructions for:

recovering context prediction probability tables used in compression;

decoding integer values corresponding to the base quality scale representation and the differential images;

reverse ordering each decoded integer value to a two-dimensional position in an array of pixels;

multiplying each decoded integer value corresponding to the base quality scale and the differential images by the quantization value;

performing the inverse transform associated with the known functions to reconstruct the digital representation of the base quality scale and the differential images;

upscaling the digital representation of an image at a lower quality scale to the next higher quality scale; and adding a differential image at a given quality scale to the upscaled image at the given quality scale to reconstruct the digital representation at the given quality scale.

27. The apparatus of claim 26 wherein for the primary color component, the context used in context prediction tables comprises a positional index and neighboring coefficients of primary color pixels, for a first secondary color component, the context comprises a positional index, coefficients of neighboring first secondary color components, and the coefficient of the primary color component of the same positional index, and for a second secondary color component, the context comprises a positional index, neighboring second secondary color coefficients, and the coefficients of the primary and first secondary color components of the same positional index.

28. The apparatus of claim 27 wherein context prediction tables are associated with quantized coefficients considered in groups, wherein a first group comprises the coefficient corresponding to a lowest positional index, a second group comprises a first row of coefficients excluding the first group coefficient, a third group comprises a first column of coefficients excluding the first group coefficient, and a fourth group comprises the remaining coefficients, and wherein the context is different for each group.

29. The apparatus of claim 26 wherein the inverse transform associated with the known functions is the inverse of a transform combining frequency transform features and multi-resolution transform features.

30. The apparatus of claim 29 wherein the inverse transform is defined recursively from an inverse discrete cosine transform and a permutation function, and wherein the input elements of the inverse transform are separated into a first portion and a second portion, the first portion containing lower scales of representation of input to the transform.

31. The apparatus of claim 30 wherein the inverse transform is an inverse discrete wavelet transform.

* * * * *